H. RAU.
MOLD FORMING APPARATUS.
APPLICATION FILED NOV. 19, 1919.
1,388,442.
Patented Aug. 23, 1921.
3 SHEETS—SHEET 1.
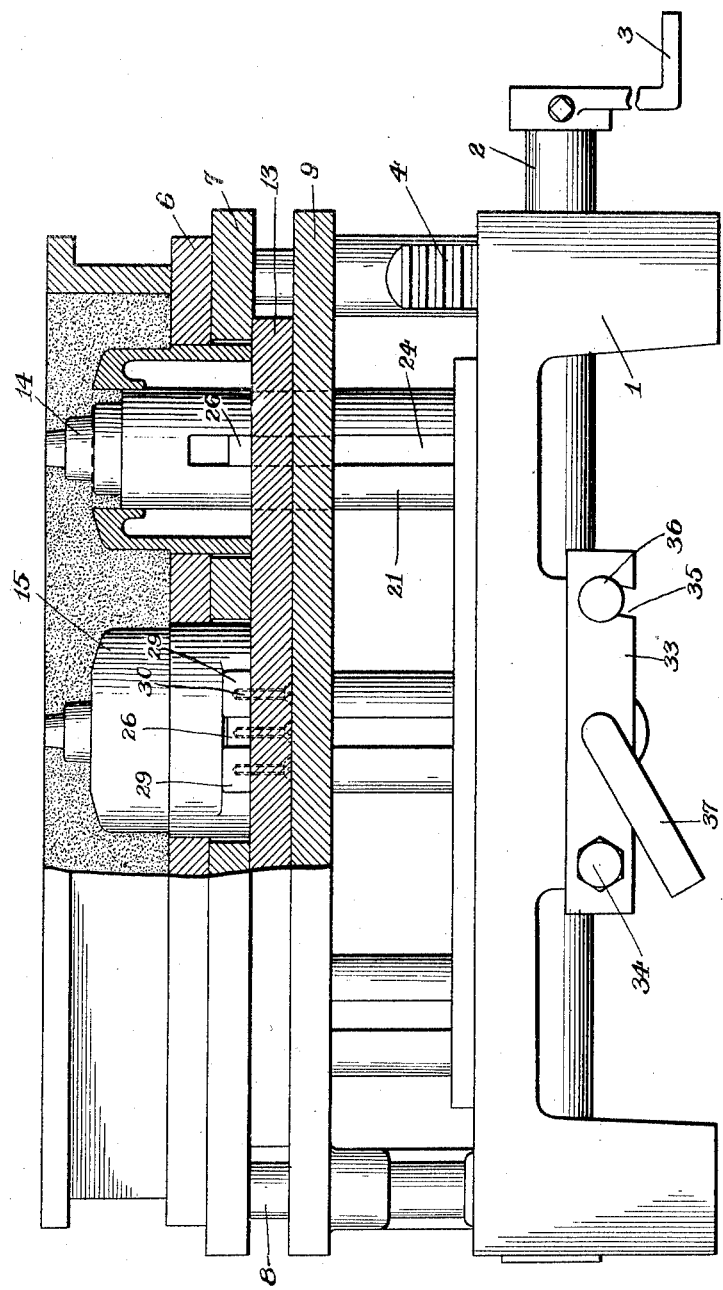

H. RAU.
MOLD FORMING APPARATUS.
APPLICATION FILED NOV. 19, 1919.
1,388,442.
Patented Aug. 23, 1921.
3 SHEETS—SHEET 2.
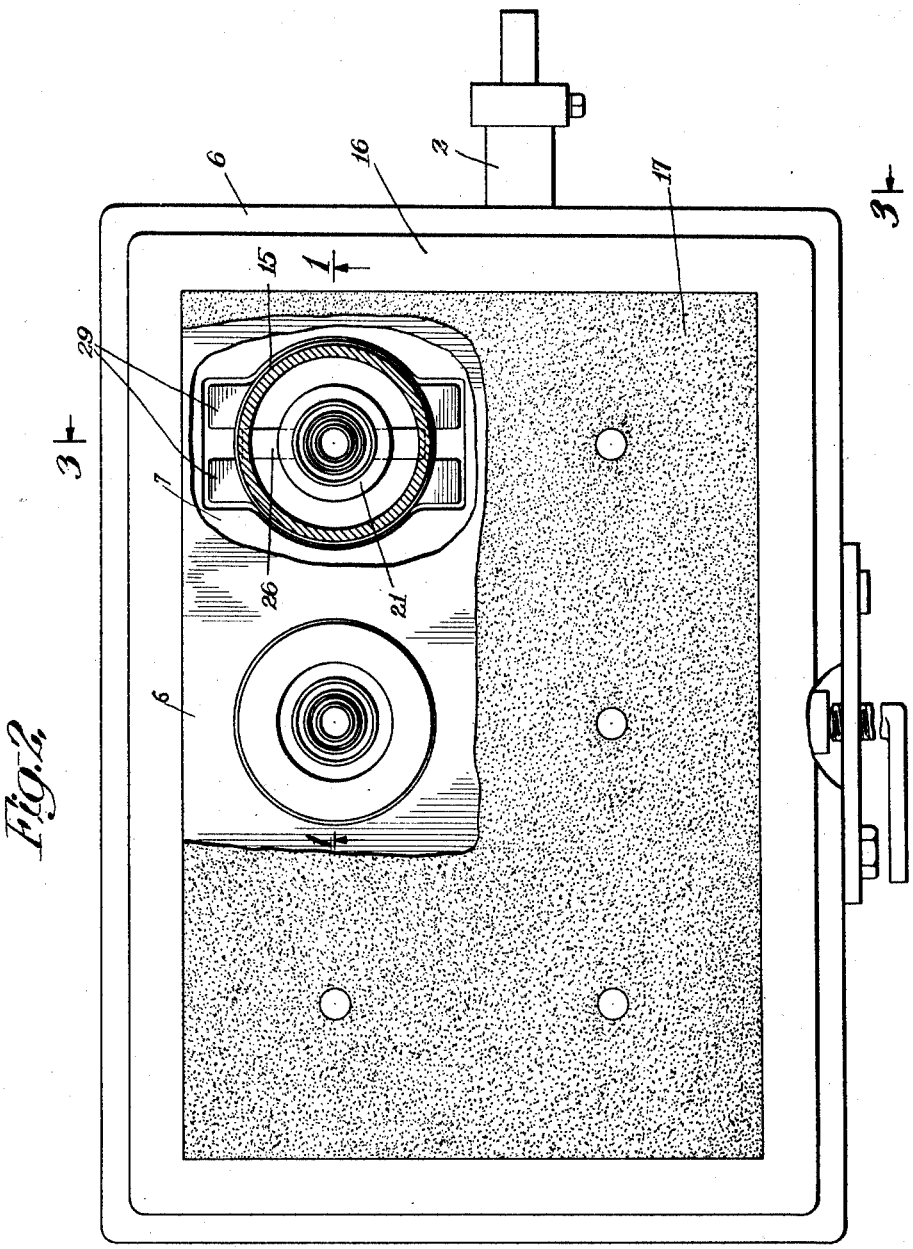

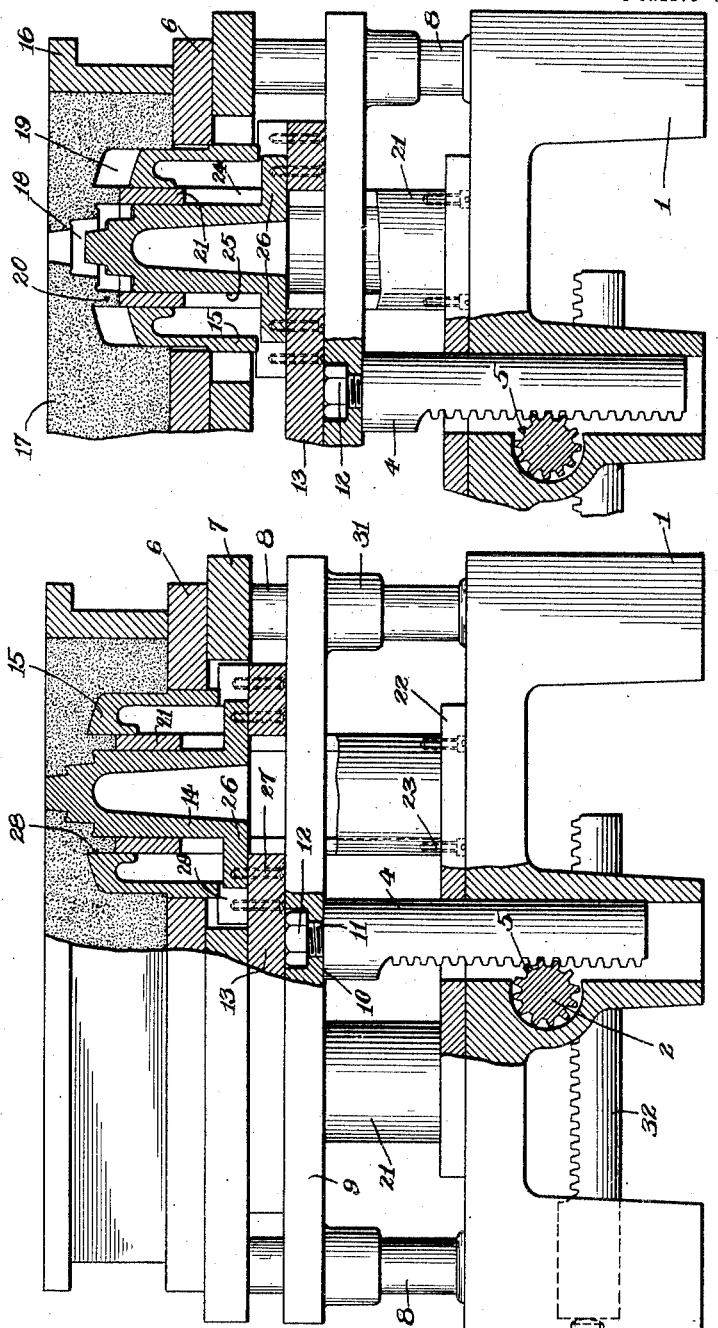

UNITED STATES PATENT OFFICE.

HERMAN RAU, OF BROOKLYN, NEW YORK, ASSIGNOR TO DOEHLER DIE CASTING COMPANY, OF BROOKLYN, NEW YORK, A CORPORATION OF NEW YORK.

MOLD-FORMING APPARATUS.

1,388,442.      Specification of Letters Patent.      Patented Aug. 23, 1921.

Application filed November 19, 1919. Serial No. 339,092.

*To all whom it may concern:*

Be it known that I, HERMAN RAU, a citizen of the United States, residing in the borough of Brooklyn, county of Kings, city and State of New York, have invented certain new and useful Improvements in Mold-Forming Apparatus, of which the following is a specification.

My invention relates to apparatus for making molds from plastic material in which one or a plurality of openings, which may be somewhat complicated in character, extend into the mold from one surface thereof. My object is to provide improved apparatus in which patterns for making openings of desired character in the mold may readily be positioned, and withdrawn from the mold after the latter has set, without marring the edges or surfaces of the openings formed in the mold.

When molds are to be made from which objects having openings therein are to be cast, difficulty sometimes arises in the operation of withdrawing the pattern or patterns, particularly when the mold is made from a plastic material in which the material expands on setting. When the pattern or a part of the same is in hollow form so that some of the plastic material of which the mold is formed is inclosed within the same, as well as surrounding the same, the expansion of the material causes it to bind against the inclosing pattern or pattern part. In such a case, if the pattern be withdrawn by a simple lengthwise movement, the pressure exerted will be trensmitted to the inclosed mold material and to some extent to the surrounding mold material, with the result that the mold material tends to move in the same direction as the pattern. This results in breaking or marring the edges of the mold cavities and prevents the successful production of molds from which castings of a finished character are to be made.

In accordance with my invention means are provided whereby pressure is exerted on the parts of a pattern which are to be withdrawn from the mold while at the same time pressure in the opposite direction is exerted on the mold material which is inclosed within the pattern parts which are to be withdrawn, or included between the same. Such apparatus is applicable to the production of molds each of which has a single mold cavity or opening of the character referred to herein, or a desired number of openings or cavities which may be of desired character. By my invention I am enabled to readily position and subsequently to withdraw patterns which would otherwise have to be cored, without the necessity of employing any loose cores. Other objects of my invention comprise the provision of improved combinations of parts and structural details as will more fully hereinafter appear.

In order that my invention may be more clearly understood, attention is hereby directed to the accompanying drawings forming part of this application and illustrating one embodiment of my invention. In the drawings, Figure 1 represents a view partly in front elevation and partly in vertical section on line 1—1 of Fig. 2 through a molding and pattern-manipulated mechanism for producing multiple cavities in a mold; Fig. 2 is a top plan view of the same, certain parts being broken away; Fig. 3 is a view partly in end elevation and partly in vertical section on line 3—3 of Fig. 2, the portions of a pattern being shown in position in the mold; and Fig. 4 is a similar view showing the portions of a pattern partly removed.

Referring to the drawings, the device illutrated is shown as having a main frame 1 through which extends a horizontal shaft 2 carrying hand crank 3 on one end thereof, shaft 2 being rotatably supported in suitable bearings in the frame 1. A pair of racks 4 are supported in suitable guideways in frame 1 for vertical reciprocation, the teeth of the racks continuously meshing with pinions 5 formed on shaft 2.

A flat plate 6, which is adapted to support a mold to be formed, may be supported above frame 1 by placing the same upon a plate or frame 7 which is supported by vertical pillars or supports 8, which extend upwardly from the main frame 1. The fixed supports 8 are of any suitable number such as four, and plate 7 may be secured to the upper ends thereof in any suitable way.

The vertical racks 4 carry the horizontal plate 9 to which they are secured by any suitable means. In the construction shown in the drawings the plate 9 rests on the horizontal surfaces 10 at the upper ends of the racks. Cylindrical threaded extensions 11 of reduced diameter extend upwardly above surfaces 10, through suitable openings in plate 9, nuts 12 being mounted in suitable recesses in plate 9 and adapted to be screwed down on the threaded extensions 11 to bind plate 9 to the racks 4.

A plate 13 is secured upon the upper surface of plate 9 by any convenient means which I have not considered it necessary to show. Pattern members 14 are secured upon plate 13 as are also the outside pattern members 15.

The plate 6 is adapted to support an inclosing frame 16 within which is formed the mold 17 of suitable material, such as a composition comprising plaster of Paris. In the drawings I have illustrated apparatus for forming mold cavities each of which is provided with an inner portion 18 and an outer annular portion 19, the portions 18 and 19 of the mold cavity being separated by an annular wall 20 of the plastic mold material, as is shown in Fig. 4.

In accordance with my invention the lower face of the wall portion 20 of the mold is formed upon and supported by the upper surface of a hollow cylindrical pattern member 21. Pattern member 21 extends upwardly from a plate 22 which may be secured by any desired means upon the upper surface of the main frame 1, pattern members 21 being shown as secured to plate 22 by means of screws 23.

It will be understood that as many pattern members 21, 14 and 15 are employed in the apparatus as may be desired, six sets of patterns being indicated in Fig. 2. Each one of the hollow stationary pattern members 21 extends upwardly through suitable openings in the plate 9 and the plate 13 carried by plate 9.

Each of the hollow pattern members 21 is provided with vertical slots 24 on diametrically opposite sides thereof. The inside pattern member 14 is provided with an outside cylindrical surface 25 which is adapted to slidably engage within the bore of pattern member 21. Pattern members 14 are provided at their lower ends with lugs 26 which extend outwardly through the vertical slots 24 in the pattern members 21, these lugs 26 being secured to plate 13 by suitable means such as the screws 27. The outside pattern member 15, which is adapted to form the annular outside space 19 in the mold cavity, is provided with an inner cylindrical surface 28, which may be formed upon an inwardly directed extension at the upper end of the member 15, surface 28 being adapted to slidably engage the outside surface of the fixed pattern member 21. Each pattern member 15 is provided at its lower end with outwardly directed lugs 29 which may be secured to plate 13 by suitable means such as the screws 30. The plate 6 is provided with suitable openings through which the outside pattern members 15 are adapted to slidably extend. Plate 7 is provided with suitable openings through which pattern members 15 and also the supporting lugs 26 and 29 of pattern members 14 and 15 may slidably extend. Plate 9 and plate 13 secured thereupon need only have openings therethrough of a suitable size to accommodate the pattern members 21. Plate 9 is slidably mounted on the vertical supports 8, and is preferably provided with bosses 31 through which the supports 8 pass to provide the proper bearing and guide surfaces for plate 9.

I have illustrated means for locking the movable pattern members in their raised positions. This may be accomplished by means of a horizontal rack 32 slidably mounted in suitable bearings in frame 1 and engaging with gear teeth formed on the main operating shaft 2. A bar 33 is pivotally mounted on a stud 34 extending outwardly from frame 1, this bar being dropped into the horizontal position shown in Fig. 1 when it is desired to lock the racks 4 in raised position. Bar 33 is provided with a slot 35 which drops over a stud when in its lowered position, this stud having a head 36 on its outer end to form an abutment against which bar 33 may press when lowered into position behind the same as shown. A latch lever 37 extends centrally through bar 33, lever 37 having a screw threaded portion which engages in screw threads formed in the opening in bar 33 through which it extends, as is indicated in Fig. 3. The end of rack 32 is in alinement with the inner end of lever 37, and when pattern members 14 and 15 are in raised position and a bar 33 has been dropped into its horizontal position as shown, a partial turn of lever 37 results in pressing the inner end of the same firmly against the end of the rack, as is shown in Fig. 3. Outward movement of rack 32, caused by the weight of vertical racks 4 and connected parts, is prevented by the engagement of lever 37 with rack 32, outward movement of bar 33 being prevented by its engagement with the head 36. When plate 9 and the pattern members carried thereby are to be lowered, lever 37 is rotated in the opposite direction to unlock the parts and permit the raising of bar 33 about its pivot 34, after which handle 3 is turned to lower racks 4 and withdraw the movable pattern members.

It is obvious that the pattern members may be given various configurations as may be desired. In operation the plate 6 is placed upon the supporting plate 7 with the openings through plate 6 in position for the pattern members 15 to extend upwardly therethrough. Plate 9 is raised to project pattern members 14 and 15 upwardly into the operative position shown in Fig. 3. A suitable frame or flask 16 is placed upon plate 6 to form the sides of the desired mold, and plastic material 17 is flowed or positioned on plate 6 to cover and surround the various patterns. It will be noted that an annular wall 20 of the plastic material is thereby formed between the adjacent surfaces of movable pattern members 14 and 15, the lower face of this wall 20 being formed upon the upper surface of the stationary pattern plate 21. When the plastic material has sufficiently set, handle 3 is turned to draw racks 4 downwardly and to, therefore, draw downwardly plate 9 and the patterns 14 and 15, as indicated in Fig. 4, until the upper surfaces of pattern members 14 and 15 have been sufficiently lowered to enable plate 6 with the mold form thereon to be lifted free of the pattern members without danger of marring the edges of the mold cavities. Plate 6 with the mold formed thereon and the inclosing frame 16 may be placed aside for the mold to thoroughly set and harden, a plate similar to plate 6 being thereupon substituted upon the supporting plate 7 and the operation repeated.

What I claim is:—

1. In mold making apparatus, the combination of a base, a hollow vertical pattern member, having vertical slots through its side walls, extending upwardly from said base, fixed vertical supports extending upwardly from said base, a plate slidably mounted on said supports, having an opening therethrough, through which said hollow pattern member extends, a mold-supporting plate, mounted on said supports, a pattern member within said hollow pattern member, having lugs extending outwardly through said vertical slots in said hollow pattern member and secured to said first named plate, said mold-supporting plate having an opening therein through which said pattern members are adapted to extend, and means for raising and lowering said first plate.

2. In mold making apparatus, the combination of a base, a hollow vertical pattern member, having vertical slots through its side walls, extending upwardly from said base, fixed vertical supports extending upwardly from said base, a plate slidably mounted on said supports, having an opening therethrough, through which said hollow pattern member extends, a mold-supporting plate, mounted on said supports, a pattern member within said hollow pattern member, having lugs extending outwardly through said vertical slots in said hollow pattern member and secured to said first named plate, a hollow pattern member outside said first hollow pattern member, adapted to slide in contact with the periphery thereof, and secured to said first named plate, said mold-supporting plate having an opening therein through which said pattern members are adapted to extend, and means for raising and lowering said first plate.

This specification signed and witnessed this 17th day of November, 1919.

HERMAN RAU.

Witnesses:
WILLIAM R. AHRBERG,
WILLIAM E. BAUERSCHNEIDER.